March 21, 1933.  C. E. McCOY  1,901,916
POWER TRANSMISSION DEVICE
Filed Jan. 15, 1930  2 Sheets-Sheet 1

Inventor
C. E. McCoy
By H.B. Whitfield Att'y.

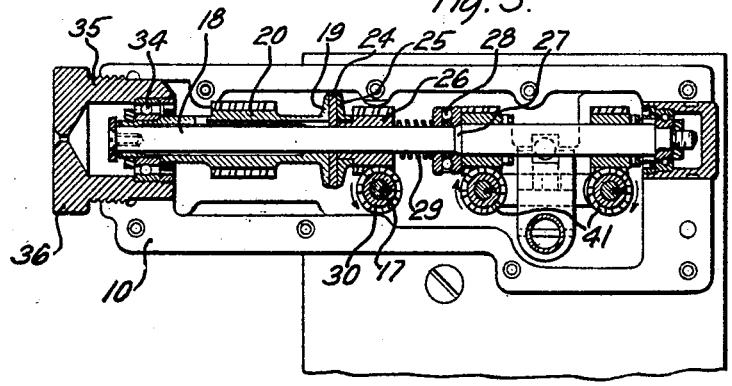
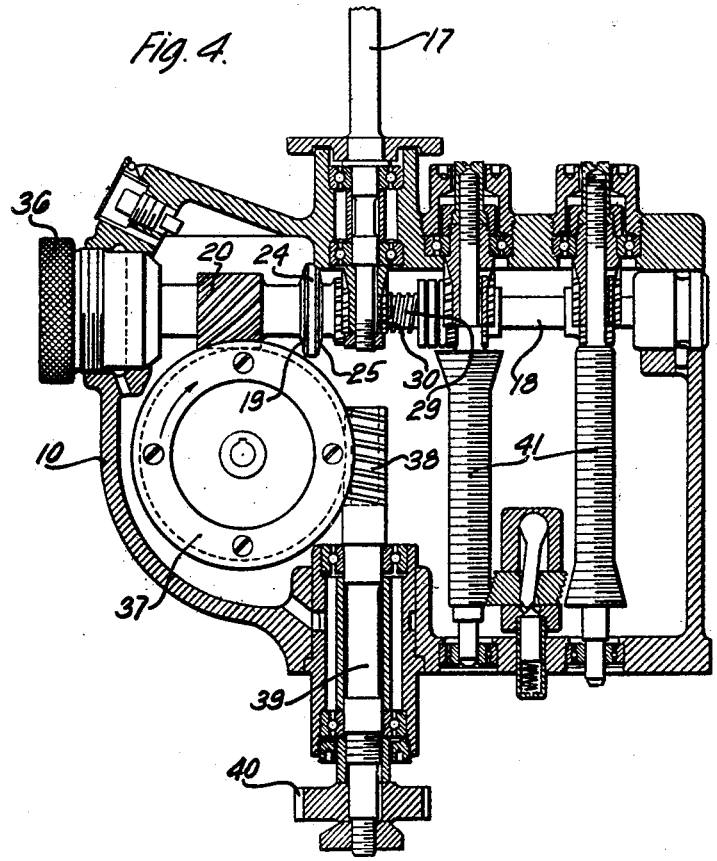

Patented Mar. 21, 1933

1,901,916

UNITED STATES PATENT OFFICE

CLARENCE E. McCOY, OF WESTERN SPRINGS, ILLINOIS, ASSIGNOR TO WESTERN ELECTRIC COMPANY, INCORPORATED, OF NEW YORK, N. Y., A CORPORATION OF NEW YORK

POWER TRANSMISSION DEVICE

Application filed January 15, 1930. Serial No. 420,852.

This invention relates to power transmission devices, and more particularly to a constant torque clutch.

An object of this invention is to provide an efficient, simple, and sturdily constructed constant torque clutch for transmission of power between a driving and a driven element.

In accordance with this object, one embodiment of the invention consists of a driving friction disk splined to a driving shaft upon which is slidably and rotatably mounted a friction disk to be driven by the driving disk and having a spiral gear secured thereto which is slidable and rotatable therewith. The spiral gear meshes with a spiral gear keyed to the shaft to be driven, and the spiral gears tend to thrust the slidable gear and the driven disk away from the driving disk. A resilient compression member is provided for maintaining a driving connection between the driving and driven disks and overcomes the aforementioned sliding or thrusting action of the spiral gear to preserve a predetermined constant amount of torque in the driven shaft. Means is also provided for manually adjusting the connection between the driving and driven disks and the amount of compression in the resilient member.

A clear understanding of the invention will be had from the following description of one specific embodiment thereof, when taken in connection with the accompanying drawings, wherein Fig. 1 is a plan view of a unit for applying textile materials to electrical conductors, in connection with which the constant torque clutch is used;

Fig. 3 is a cross-sectional view of the unit taken on the line 3—3 of Fig. 2 and showing the devised clutch in plan view, and Fig. 4 is a cross-sectional view of the insulating unit taken on the line 4—4 of Fig. 1 and showing an elevational view of the clutch.

Figure 1:
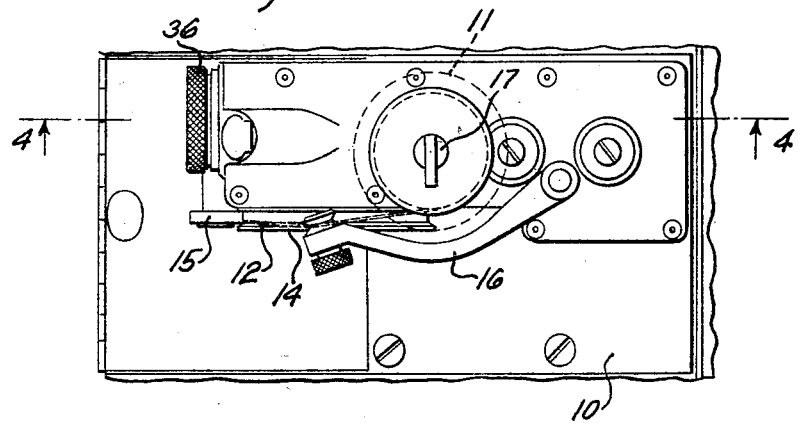
Figure 2:
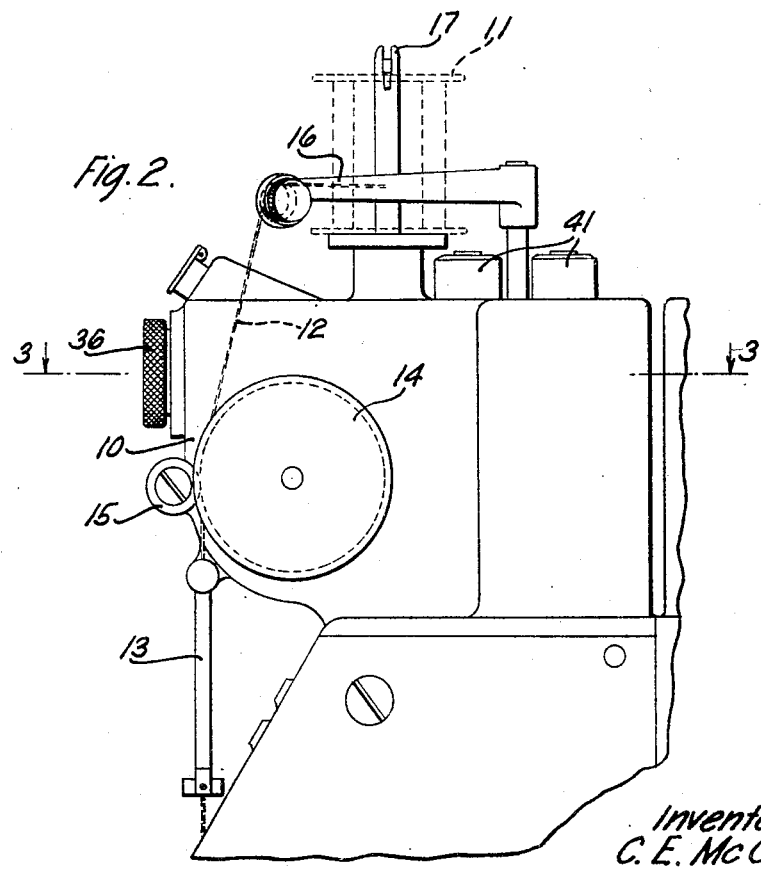
Fig. 2 is a fragmentary elevational view of this same insulating unit.

Referring now to the drawings, in which like reference numerals designate similar parts throughout the several figures, there is disclosed a housing 10 for the upper portion or head of a textile insulating unit which supports a take-up spool 11 on which the conductor 12, which has been insulated with the textile material by the unit, is wound. The conductor is drawn up through a tube 13 after the insulation has been applied thereto, and over and around a capstan 14 and underneath a cooperating guide roller 15 and then over an oscillatory distributor arm 16 which directs the conductor up and down across the spool. The spool 11 is suitably clamped to a vertical shaft 17 which rotates it, and it is the purpose of this invention to provide a clutch which will afford a constant or uniform torque in the shaft 17 in order to maintain a constant and even tension in the conductor 12 as it is wound on the spool, and particularly to cause the shaft and spool to rotate at a lower rate of speed as the spool fills up with the conductor so that the conductor will not be drawn therearound under greater tension.

Referring now to Figs. 3 and 4, a horizontal driving shaft 18 is suitably supported within the housing 10 and has a driving friction disk 19 constructed integrally with a spiral gear 20 splined thereto. A suitable annular friction plate or member 24, preferably a cork disk, for providing a high coefficient of friction is disposed adjacent to the disk 19, and next to the friction plate 24 abuts a friction disk 25 which is secured to a spiral gear 26, the friction disk 25 and the spiral gear 26 both being slidably and rotatably mounted as a unit upon the driving shaft 18. A shoulder 27 (Fig. 3) is provided upon the shaft 18 against which abuts a thrust bearing 28 and a resilient member or compression spring 29 is interposed along the shaft 18 between the spiral gear 26 and the bearing 28 to force the spiral gear 26 and the friction disk 25 secured thereto towards the driving disk 19 and the friction plate 24 to maintain a driving engagement with the driving disk 19.

The vertical shaft 17, which carries the take-up spool 11, has a spiral gear 30 secured or keyed to the lower end thereof which meshes with the slidable spiral gear 26, and the spiral teeth of the gears 26 and 30 are so related to each other that the end thrust produced by the camming action thereof tends to force or slide the spiral gear 26 and the friction disk 25 to the right or away from the driving disk 19 and to interrupt or discontinue the driving relationship between these disks. The greater the resistance of shaft 17 to rotation the greater the camming action between gears 26 and 30 and thence the greater the tendency of the disks to slip relative to each other. However, the compression spring 29 opposes this end thrust or sliding action of the spiral gear 26 to maintain the driven disk 25 in engagement with the friction plate 24 and the driving disk 19, and it will therefore be understood that a balance is provided between the end thrust of the spiral gear 26 and the compression of the spring 29 to maintain a constant torque in the driven shaft 17 and hence in the take-up spool 11, depending upon the amount of compression in the spring 29. It is therefore apparent that due to such a balance, the tension provided in the conductor 12 being taken up may be regulated and maintained at a constant amount.

The left-hand end of the spiral gear 20 and the integral driving disk 19 is suitably secured to a ball type bearing 34 which is fastened to an adjustable threaded bushing 35, and by manually manipulating the knurled knob 36 forming a part of this bushing the driving disk 19 may be longitudinally adjusted along its spline on the shaft 18 to regulate the compression in the spring 29 to control the amount of gripping action between the two disks. Thus, it is apparent that by means of this hand manipulation combined with the thrusting action of the spiral gear 26 and the opposing action of the compression member 29, a predetermined amount of torque will be provided in the take-up spool 11 and that the apparatus will automatically maintain this torque at a constant unvarying value and provide an even, smooth take-up of the conductor 12. It will also be noted that as the take-up spool 11 builds up with the conductor 12, and thus tends to wind the conductor at a higher rate of speed due to the increase of the lever arm provided by the increasing size of the spool, gears 26 and 30 will cooperate to urge the friction disks away from each other and permit a sufficient amount of slippage to take place between the disks to cause the take-up spool to rotate more slowly and thus maintain a constant speed and tension in the conductor 12.

The driving spiral gear 20 is driven by gears 37, (Fig. 4), 38, the vertical shaft 39, and a gear 40 which is actuated by a power driven means (not shown), but this driving structure is not concerned with the invention. Also, the reciprocatory distributor arm 16 is actuated by a pair of screws 41, but they have no bearing upon the constant torque clutch.

It is therefore believed to be apparent from the foregoing description that the clutch provided by this invention serves to maintain a constant and even torque or tension in the conductor being spooled and that the slippage provided between the driving and driven disks serves to cause the conductor to be advanced at a constant rate of speed. It is to be noted in this connection that the clutch need not necessarily be applied to a textile insulating machine, but is capable of use with any apparatus requiring a constant torque. It is, of course, to be understood that the invention is not to be limited to the specific embodiment herein described and illustrated, but is limited only by the scope of the appended claims.

What is claimed is:

1. In a constant torque clutch, a driving shaft, a friction disk keyed thereto for driving purposes, a friction disk driven by the driving friction disk, a spiral gear secured to the driven friction disk, the spiral gear and the driven friction disk being slidably mounted on the driving shaft, a shaft to be driven, a spiral gear splined to the shaft to be driven and meshing with the aforementioned slidable spiral gear and tending to thrust it and the driven friction disk away from the driving disk, and a resilient member opposing this thrusting action to maintain the driving and driven disks in engagement.

2. In a clutch, a driving shaft, a driving friction disk keyed thereto, a friction disk driven thereby, a spiral gear secured to the driven friction disk, the spiral gear and the driven friction disk being slidably mounted as a unit on the driving shaft, a shaft to be driven, a spiral gear keyed to the shaft to be driven and meshing with the aforementioned slidable spiral gear and tending to thrust it and the driven friction disk away from the driving disk, a resilient member opposing this thrusting action to maintain the driving and driven disks in engagement, and means for adjusting the position of the friction disks with respect to the resilient member.

3. In a constant torque clutch mechanism, a driving member, a driven member, a friction clutch between said members, a spiral gear associated with the driven member and tending upon rotation to disengage the clutch, and resilient means tending to engage the clutch, said gear and resilient means being so correlated as to transmit a constant torque to the driven member.

In witness whereof, I hereunto subscribe my name this 6th day of January A. D., 1930.

CLARENCE E. McCOY.